United States Patent [19]
Vickery et al.

[11] 3,951,849
[45] Apr. 20, 1976

[54] PRODUCTION OF DISPERSIONS OF FINE POWDERS

[75] Inventors: Glenn C. Vickery, Barberton; Donald M. Mozynski, Elyria, both of Ohio

[73] Assignee: Basic Incorporated, Cleveland, Ohio

[22] Filed: July 25, 1973

[21] Appl. No.: 382,346

Related U.S. Application Data

[62] Division of Ser. No. 178,081, Sept. 7, 1971, abandoned.

[52] U.S. Cl. .............................. 252/309; 106/308 F; 252/192; 252/194; 252/314; 252/315; 252/363.5
[51] Int. Cl.² .......................................... B01J 13/00
[58] Field of Search ........ 252/309, 314, 315, 363.5; 106/308 F

[56] References Cited
UNITED STATES PATENTS

| | | | |
|---|---|---|---|
| 1,969,242 | 8/1934 | Szegvari | 252/314 X |
| 2,318,439 | 5/1943 | Waldron | 252/314 X |
| 2,671,758 | 3/1954 | Vinograd et al. | 252/309 X |
| 3,032,430 | 5/1962 | Heller | 252/314 X |

FOREIGN PATENTS OR APPLICATIONS

| | | | |
|---|---|---|---|
| 890,262 | 2/1962 | United Kingdom | 260/746 |
| 974,872 | 11/1964 | United Kingdom | 260/745 |

*Primary Examiner*—Richard D. Lovering
*Attorney, Agent, or Firm*—Donnelly, Maky, Renner & Otto

[57] ABSTRACT

A process for preparing a high solids paste dispersion of fine particle size solid material in a vehicle which comprises premixing the solid material with the vehicle and a deagglomerating agent. The proportions of solid material, vehicle and deagglomerating agent are such that the premix remains a dry discrete flowable powder. The premix is then passed through a colloid mill which converts the powder to a paste dispersion in the form of a coherent mass in one pass through the mill.

18 Claims, 1 Drawing Figure

PRODUCTION OF DISPERSIONS OF FINE POWDERS

This is a division of application Ser. No. 178,081 filed Sept. 7, 1971 and now abandoned.

DESCRIPTION

The present invention relates to a novel process for preparing paste dispersions, and particularly to a novel method for dispersing a greater amount of finely divided solid material in an oil vehicle than is possible with conventional milling or mixing.

The invention is particularly applicable to the preparation of dispersions suitable for organic polymer compounding, and will be described with reference thereto, although it will be appreciated that the invention has broader application, such as in the preparation of dispersions for the paint industry, the preparation of inks, textile colors, and carbon black dispersions. For purposes of the present application, the term "polymer" includes both synthetic and natural rubbers, elastomers and plastics.

Both finely divided calcium oxide and magnesium oxide are conventionally employed in polymer compounding formulations. Calcium oxide acts as a desiccant to reduce the water content in the polymer, and magnesium oxide reacts with hydrogen chloride gas which evolves during mixing of the polymer and curing. Hydrogen chloride gas is injurious to polymers in that it causes degradation of the same during processing and curing. Magnesium oxide takes up incipient hydrogen chloride forming magnesium chloride which inhibits further hydrogen chloride evolution.

The introduction of these powdered materials directly into the polymer, to obtain a uniform distribution, is effected only with considerable difficulty. Conventionally, the powdered materials have been mixed with a liquid vehicle forming dispersions which facilitate working. Use of a liquid hydrophobic vehicle also prevents hydration of water sensitive powder materials. However, such dispersions tend to settle on long standing or storage and may be difficult to handle. In addition, the dispersions require a relatively high ratio of vehicle to solid material for optimum handling, which vehicle has the effect of diluting the polymer formulation requiring that the same be modified to accommodate the added vehicle.

Mixing magnesium oxide directly with the polymer is particularly difficult because of the quick formation of a hard mix, even with a very small amount of magnesium oxide. Dispersing the magnesium oxide in a vehicle facilitates compounding, but such a dispersion of magnesium oxide will conventionally have only about 40–60% finely divided solid material in it, so that the amount of vehicle dilution of the polymer is considerable.

The above problem could be overcome if it were possible to increase the solids concentration in the dispersion. However, this has not heretofore been possible, at least economically, with conventional processes and equipment.

Accordingly, it is a principal object of the present invention to provide a method for obtaining paste dispersions having a higher concentration of a given finely divided solid material than heretofore obtainable using conventional techniques.

It is further an object of the present invention to provide a process for obtaining dispersions, of finely divided solid material, which are particularly suitable for polymer compounding.

It is still further an object of the present invention to provide an improved process by which dispersions of finely divided solid material can be obtained with less working than prior processes.

A further object of the present invention is to provide dispersions of finely divided solid material in paste form which have improved properties, particularly for polymer compounding.

Another object of the present invention is to provide a method for obtaining paste dispersions of increased activity containing a high concentration of high surface area highly active powder material.

A still further object of the present invention is to provide an improved method by which solid materials can be incorporated into polymer mixtures and compositions.

Still another object of the present invention is to provide a paste dispersion in which contained high surface area water reactive powders are protected from hydration.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

In the following description, all percentages are by weight unless otherwise stated. Temperature is in degrees Fahrenheit, and viscosity is given in terms of Standard Saybolt Universal seconds at 100°F. The Iodine Adsorption No. as employed in this application is an indicator of the total surface area and probable activity of magnesia in polymer applications.

Figure 1:
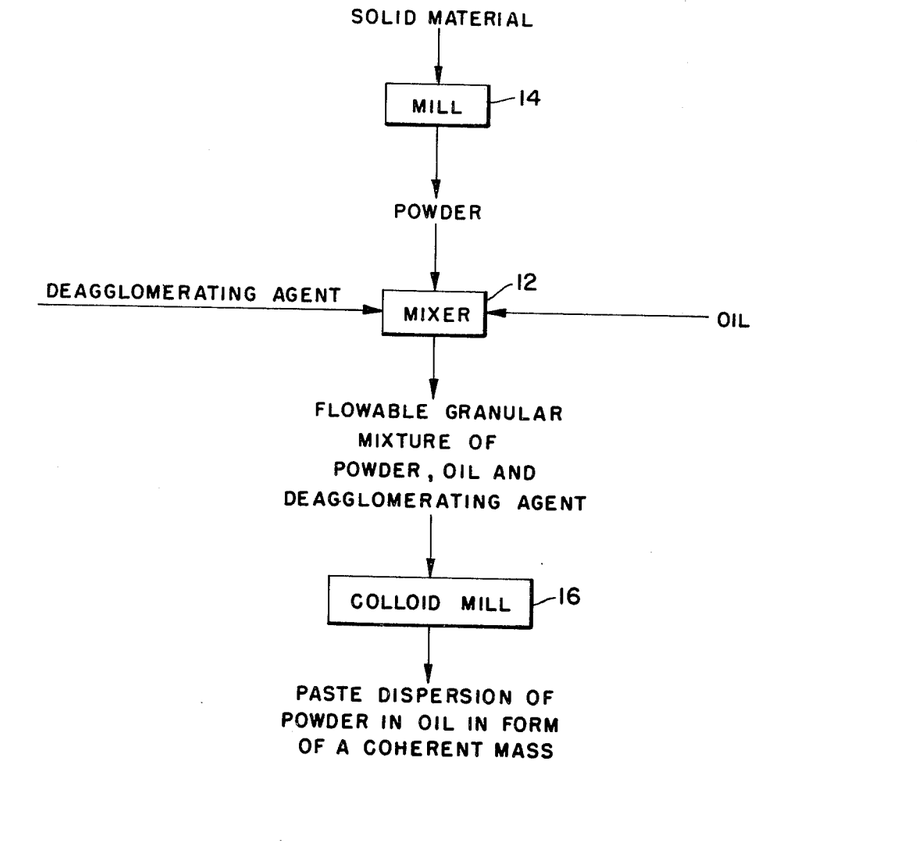
The FIGURE is a flow diagram illustrating a process for the preparation of paste dispersions in accordance with the concepts of the present invention.

In the practice of the present invention, referring to the FIGURE, solid material, such as magnesia or calcium oxide, in finely divided form, is introduced into a mixer 12 along with a suitable vehicle, such as a mineral oil, and a deagglomerating agent. The solid material may be in a sufficiently finely divided state as a result of normal processing of the material, or first may be comminuted in mill 14 to a fine state.

For instance, magnesia from sea water is in a finely divided form normally, having an average particle size which is in the range of about 0.02–1 micron. Calcium oxide and calcium carbonate on the other hand should be reduced to a fine particle size by comminution, for instance in a roll mill, to an average particle size of about 1 micron. Generally speaking, it is desirable to have as fine a particle size as possible for the solid material, although depending upon the particular material, satisfactory results are obtained with an average particle size up from about 0.01 to about 10 microns. A preferred sizing for most materials is between about 0.02 microns to about 2 microns.

Following mixing, the discrete powder material with vehicle and deagglomerating agent added thereto is passed through a colloid mill 16. In the colloid mill the flowable granular mixture is converted into a paste or dispersion of powder material in the form of a coherent is. The same is accomplished substantially instantaneously with a holding time of less than a few seconds. Conventional gap settings and speeds for the colloid 16 can be employed. Use of a gap setting in the range of 0.002–0.080 inches is workable, with a gap setting in the range of 0.010–0.025 inches being preferred. Conventional speeds for the colloid mill are in the range of 5,000 – 20,000 RPM.

The significant feature of the present invention is that the amount of finely divided solid material in the dispersion is about 5% to about 10% higher than that obtainable with conventional mixing or milling techniques. For instance, with a three roll mill, employing magnesium oxide as the solid material, the highest loading possible with conventional techniques while obtaining a paste or coherent mass is about 60%. Increasing the loading any further results in inefficient wetting of the surface of the solid material, and the product even if millable is in the form of a powder or agglomeration, far removed from a paste. In the present invention, the concentration of solid particles in the starting material is increased purposely so that following mixing in mixer 12 (and even three-roll milling), the mix is a flowable granular product. A surprising aspect of the invention is that this granular mixture can then be converted to a cohesive soft paste, substantially instantaneously, by passage through a colloid mill.

The actual proportions of solid material, vehicle and deagglomerating agent must be predetermined for each dispersion. The proportions will vary depending upon the type of vehicle, type of deagglomerating agent, type of material, and also on the particle size of the material (with a coarser material, less vehicle is used). Particularly, the amount of vehicle and deagglomerating agent should be insufficient to form a continuous liquid phase in the premix following mixing. On the other hand the amount should be sufficient that during passage through the colloid mill conversion to a paste occurs.

The optimum proportions for each dispersion can be determined by employing the ASTM Test D-281 (Index of ASTM Standards, 1969) entitled "Oil Absorption of Pigments by Spatula Rub Out." The vehicle and deagglomerating agent therein is added to the powdered or granular solid material, employing spatula rub out, until an end point of maximum absorption is reached. This end point conventionally gives an oil absorption number. However, the optimum proportions (in accordance with the present invention) of solid material, vehicle and deagglomerating agent can be obtained by first determining the proportions at end point and then increasing the solids content by about 5–15%, for example from 60% to 65–75%.

In a particular example, employing magnesium oxide having an average particle size prior to milling of about ½–1 microns, the end point (depending upon the vehicle and deagglomerating agent) is reached at a solids concentration of about 55–60% by weight. Conversion to a paste with the same magnesium oxide occurs in the colloid mill with a concentration from about 70 to about 75% by weight, the remainder being vehicle and deagglomerating agent (2–5% for the latter). In the case of calcium oxide having a coarser particle size of about one micron (average following comminution) with an end point at about 70–75% by weight solids, the optimum premix in accordance with the present invention will comprise about 75–90% by weight solid material, about 1% deagglomerating agent and the remainder vehicle. Zinc oxide having a true specific gravity higher than either magnesium oxide or calcium oxide (about 5.5 versus about 3.6 or 3.4 respectively) with a particle size of about one micron, will, as with calcium oxide, require only about 1% deagglomerating agent for about 75–92% solid material, the remainder being vehicle.

The initial mixing (in mixer 12) of the powdered material, deflocculating agent and vehicle can be carried out in various types of mixers. Some of these are described in Sections 19 and 21 of the Fourth Edition of Perry's Chemical Engineers' Handbook, examples being turbine type mixers, twin-rotor mixers, twin-shell blenders, ribbon blenders, muller-mixers, high speed, single-rotor mixers and kneader-mixers. Particularly effective results are obtained in a single-rotor mixer such as the Lodige mixer, made by Littleford Bros., Cincinnati, Ohio, in which the primary mixing is done by multiple plow blades on a horizontal shaft operating at a speed of about 155 rpm. Secondary mixing may be accomplished by a small "chopper" blade in the mixer. The advantage of this mixer is the speed with which mixing is accomplished reducing the likelihood of hydration of sensitive powders.

The vehicle employed can be any conventional liquid used in polymer compounding such as a mineral oil, a vegetable oil (such as castor oil or soybean oil), or a material such as dioctylphthalate. Although the vehicle may have a relatively high viscosity and boiling point to minimize volatility since heat is generated in the colloid mill, the use of low viscosity vehicles is within the scope of this invention. A vehicle having a relatively high viscosity, for instance in the range of 1,000–6,000 Saybolt Seconds Universal at 100°F, preferably about 2,000 SUS, also has the advantage of providing a dispersion having optimum paste consistency and minimum volatility during subsequent polymer compounding and curing steps. In the case of polymer compounding, this prevents undue porosity of the polymer product. A high viscosity vehicle is also likely to exhibit more compatibility with the polymer. A very suitable napthenic mineral oil vehicle is Sunoco's Sunthene No. 4240 (trademark) having a Saybolt Universal viscosity of about 2,206 seconds at 100°F. Sunoco Sunthene 5600 (SUS-5000) has also been successfully used. Other high molecular weight vehicles successfully tested are propylene glycol and polyethylene glycol (molecular weight above 1,500 preferred). Suitable low viscosity oils which can be employed are Sunthene 415 (a light naphthenic oil, trademark Sunoco) having a Saybolt Universal viscosity at 100°F of about 155 seconds, and Sunpar No. 107 (a light paraffinic oil, trademark Sunoco) having a Saybolt Universal viscosity at 100°F of about 72.5 seconds. However, with such relatively light oils, a corresponding smaller gap setting in the colloid mill may be desirable. Other low viscosity vehicles which can be employed are water, kerosene, the chlorinated hydrocarbons such as 1,1,1 trichloroethylene, and other halogenated hydrocarbons. Properties that may be desired of the vehicle are resistance to physical and chemical changes with heat, and compatibility with the particulate solids and end use, i.e., the polymer compound. Good lubricity may also be desirable for subsequent compounding and processing steps. Generally speaking, naphthenic or paraffinic mineral oils are preferred over vegetable oils since the latter generally are not considered heat stable, or stable on storage.

Suitable deagglomerating agents which may be employed in the process of the present invention are surfactants described in the art, for instance in the Baum U.S. Pat. No. 2,544,483, which patent also is directed to the preparation of dispersions of inorganic materials. For an oil vehicle, chlorinated hydrocarbons and glycols, such agents should be oil soluble or dispersible having a hydrocarbon chain sufficiently long (9–20 carbon atoms) to impart oil solubility, and in addition, should have strong polar groups (hydroxyl or carboxyl) to impart surface active properties. For polymer compounding, the monoglyceride materials having hydroxyl groups thereon are useful as the hydroxyl groups do not adversely affect the polymer product. Other agents given in the Baum patent are lecithin, zinc naphthenate and sodium petroleum sulfonate. An additional list of agents includes stearic acid, isostearic acid, oleic acid, calcium petroleum sulfonate, glyceryl dioleate, glyceryl mono-ricinoleate, polyethylene glycol monoricinoleate, lauryl amine hydroxy stearate, zinc stearate, lead naphthenate, tetradecane amide, salicyclic acid, nonyl alcohol, sorbitan mono-oleate and sebacic acid. Preferably about 1–5% deagglomerating agent is employed, although this may vary depending upon the solids content, the particular powdered material employed and vehicle. For a fine particle size material, such as some magnesium oxides, a preferred amount is about 2–5%. For coarser or denser materials, about 1–2% should suffice. There may be instances where amounts as high as 10–20% deagglomerating agent would be used. For most purposes, a maximum of 5% deagglomerating agent should suffice.

Other materials can be employed in the dispersion of the present invention to modify the properties of the dispersion. For instance, the Izod et al British patent 890,262 discloses paste dispersions of quicklime in a mineral oil or fatty oil including lecithin as a wetting agent, to which is added paraffin and synthetic waxes as thickening agents. The amount of wax employed was sufficient in this patent so that it actually functioned as part of the dispersing medium. However, the same wax in the present invention, in smaller amounts (about 2–5%) may be employed to obtain physical characteristics desirable for introduction of the dispersion into a polymer batch. Micro-crystalline wax, when employed in small amounts helps as a moisture barrier, and also as an extrusion lubricant to give good surface smoothness and appearance. It also helps to provide good release properties in eventual polymer process equipment. Other thickeners such as Bentone 34 and Bentone 38 (aminated bentonites, trademark National Lead Corporation) and metallic soaps provide the same properties as micro-crystalline wax.

In addition to the oxides of calcium, magnesium and zinc, the following powders can be successfully dispersed: hydrated silica, calcium carbonate, clay, lead oxide, calcium metasilicate, titanium dioxide, antimony oxide, carbon black and talc. In general, any of the dispersions for the paint and paper industries, for inks, for textile coloring, or those containing carbon black, and for other applications where it is important to keep vehicle dilution as low as possible can be prepared in accordance with the concepts of the present invention.

A preferred colloid mill which can be employed is the paste type Premier colloid mill, although for purposes of the present application, the term "colloid mill" shall be deemed to include any high speed disk or cone mill such as that of Morehouse, or disk attrition mill such as that made by Bauer or Sprout-Waldron, or the buhrston mill. Preferably the mill is equipped with a hard abrasive millstone surface or an artificial abrasive surface such as silicon carbide or aluminum oxide to provide a high speed rotary tearing or shredding action in operation. Many descriptions of colloid or colloid-type mills can be found in the literature, one suitable description being on page 339, Chemical Engineers' Handbook, Perry, 4th Edition.

It was mentioned above that the mill preferably has a gap between about 0.01–0.025 inches. The larger gap increases throughput in the colloid mill, but conversion may be erratic at too large a gap. Smaller gaps cause stone breakage. An optimum gap depends upon materials employed, but 0.020 inches for most materials appears to provide 100% conversion with near maximum throughput. With the use of a very light vehicle, such as Sunthene No. 415 or Sunpar No. 107 (supra), and a very fine particle size solid material, a gap setting as small as 0.003 inches may be employed.

The following examples illustrate the present invention:

EXAMPLE 1

A powder blend of 80 parts medium high activity magnesia having an Iodine Adsorption No. of about 50 (98% pure MgO) and an average particle size of less than about 1 micron, 4 parts sorbitan mono-oleate deagglomerating agent, and 16 parts Sunthene 415 naphthenic oil was premixed in a pony mixer, in preparation for feeding into a colloid mill. The powder blend at about 77°F was dry to the degree that it flowed easily, was not sticky and did not agglomerate or bridge in the colloid mill feed hopper. The blend was fed to the colloid mill, having a gap setting of 0.003 inches, and produced a cohesive fluid paste with a mill exit temperature of about 300°F. The 300°F paste material was cooled and was firm, not sticky and was easy to cut. The 80% paste was tested in a neoprene rubber compound, and had higher activity as measured by scorch and cure rate than the original 100% magnesia starting material tested, on a pound for pound basis. It is believed that the higher activity of the dispersion is due to a considerable increase in surface area effected by the intense shear of the colloid milling.

After 24 hours, on exposure to 98% relative humidity, at 80°F, the paste dispersion of the invention showed less than 0.2% by weight moisture absorption. By comparison, the original powder magnesia absorbed over 12% by weight moisture under the same exposure conditions.

The bulk density of the paste dispersion was 2.1, or about seven times the bulk density of the starting magnesia powder.

The same blend containing 80 parts magnesia when passed through a 3-roll mill remained as a free flowing powder and did not convert to a cohesive mass.

In another comparison test, using the same 98% pure medium high activity magnesia, same vehicle and deflocculating agent, the maximum solids concentration obtainable with a high speed impeller disperser, to get a paste product of similar consistency, was about 65%. In a three-roll mill, the maximum concentration, while still obtaining a paste product, was about 70% solids by weight. It would be possible to gradually increase the loading somewhat with continued three-roll milling, but only with very tedious effort (for instance 24 hours of working).

EXAMPLE 2

This example illustrates that a dispersion of increased solids content over conventional mixing can be obtained following the concepts of the present invention. The following solid materials were used in comparative tests:

Zinc oxide (Kadox 15, New Jersey Zinc Co.);
Calcium carbonate (Camel White, Harry R. Campbell & Sons);
Hydrated silica (Hi Sil 233, PPG Industries, Inc.)
Calcium metasilicate (Cabolite, Cabot Corporation); and
Antimony oxide (SB 203, Kemetron).

In each instance, the conventional mix was prepared by dispersing as much solids as possible, using a sigma mixer and heat, or other conventional methods necessary to obtain a maximum dispersion loading. The maximum quantity was then increased by 5 percent solids to produce a dry free-flowing powder. This powder after mixing in a Lodige mixer was fed to a Premier mill and observed for conversion to a dispersed paste. The following Table I details this work. The product obtained from the conventional mix is so identified in the table. The dispersion prepared in accordance with the concepts of the present invention is identified as "dry blend dispersion." Two vehicles were employed, Sunpar No. 107 Sunthene 4240 (supra). The deagglomerating agent used was sorbitan mono-oleate (SMO). In most instances, conventional mixing took between 30 and 60 minutes to achieve the solids loading indicated, whereas processing of the dry blend dispersion required less than 2 minutes for preblending and one minute for finishing in the colloid mill.

TABLE I

| Solid Phase | Solids | Percents by Weight 107 | 4240 | SMO | Comment |
|---|---|---|---|---|---|
| Calcium Carbonate (Campbell) | | | | | |
| Conventional Mix | 85.0 | 14.6 | | .4 | Thick paste which set following mixing. |
| Dry Blend Dispersion | 90.0 | 9.6 | | .4 | Extrudable soft paste. |
| Conventional Mix | 85.0 | | 14.6 | .4 | Dilatant paste difficult to mix. |
| Dry Blend Dispersion | 90.0 | | 9.6 | .4 | Product has dough-like consistency, good dispersion. |
| Conventional Mix | 86.0 | | 13.6 | .4 | Difficult to mix, thick paste. |
| Cabolite (Cabot) | | | | | |
| Conventional Mix | 85.0 | 14.5 | | .5 | Putty like mix is flowable while hot. |
| Dry Blend Dispersion | 90.0 | 9.6 | | .4 | Flowable paste thinner than conventional mix. |
| Antimony Oxide (Chemetron) | | | | | |
| Conventional Mix | 86.0 | 13.5 | | .5 | Smooth white paste |
| Dry Blend Dispersion | 91.0 | 7.0 | | 2.0 | Flows from Premier, although increased in viscosity following expansion. |
| Hi Sil 233 (PPG) | | | | | |
| Conventional Mix | 31.0 | 67.0 | | 2.0 | Thick paste. |
| Dry Blend Dispersion | 37.0 | 61.0 | | 2.0 | Thick paste. |

EXAMPLE 3

This example illustrates the advantages of the present invention over a conventional dry blend mixing, with different vehicles. The solid material employed was a hydrated silica (Hi Sil 233, trademark P.P.G.) which is a material difficult to work with. The following vehicles were tested: propylene glycol, polyethylene glycol, castor oil, soybean oil, linseed oil and dioctylphthalate. Deagglomerants employed were sorbitan mono-oleate and stearic acid, the latter being melted into the oil. Stearic acid was employed in a few mixes to show that different deagglomerating agents can and do work in accordance with the concepts of the present invention. The dispersion prepared in accordance with the present invention (termed "Dry Blend Dispersion") was fed to a Premier colloid mill in the usual fashion. The following Table II gives the results. As with Example 2, conventional working required 30 to 60 minutes as compared to about three minutes for processing in accordance with the concepts of the present invention.

TABLE II

| Vehicle | Type of Mix | Hi Sil 233 | Percents by Weight Vehicle | SMO | Stearic Acid | Comment |
|---|---|---|---|---|---|---|
| Propylene Glycol | Conventional | 31.7 | 66.5 | 1.8 | — | Gel-like compressible paste |
| | Dry Blend Dispersion | 36.7 | 60.9 | 2.4 | — | Wet paste - mill exit temp. about 220°F |
| Polyethylene Glycol | Conventional | 31.8 | 66.3 | 1.9 | — | Dry, gel-like material |
| | Dry Blend Dispersion | 36.8 | 60.8 | 2.4 | — | Soft paste, good dispersion |
| Polyethylene Glycol | Conventional | 30.0 | 67.8 | — | 2.2 | Gel-like material |
| | Dry Blend Dispersion | 35.0 | 62.4 | — | 2.6 | Soft paste |
| Castor Oil | Conventional | 32.1 | 66.1 | 1.8 | — | Gel-like, dry |
| | Dry Blend Dispersion | 37.1 | 60.8 | 2.1 | — | Soft paste |
| Soybean Oil | Conventional | 32.4 | 65.7 | 1.9 | — | Dry, gel-like |
| | Dry Blend Dispersion | 37.4 | 60.4 | 2.2 | — | Soft paste |
| Linseed Oil | Conventional | 36.4 | 61.8 | 1.8 | — | Dry, gel-like |
| | Dry Blend Dispersion | 41.4 | 56.3 | 2.3 | — | Soft paste |

TABLE II-continued

| Vehicle | Type of Mix | Hi Sil 233 | Percents by Weight Vehicle | SMO | Stearic Acid | Comment |
|---|---|---|---|---|---|---|
| DOP | Conventional Dry Blend Dispersion | 32.0 | 66.0 | 2.0 | — | Dry gel |
|  |  | 37.0 | 60.7 | 2.3 | — | Soft paste |

EXAMPLE 4

A very suitable high activity magnesium oxide dispersion for polymer compounding was prepared using the following formulation:

| | Percents by weight |
|---|---|
| Magnesium oxide | 72 |
| Sunthene 4240 (supra) | 22 |
| Sorbitan mono-oleate | 2 |
| Wax, microcrystalline (180–190°F softening point) | 4 |
| | 100 |

The magnesium oxide was about 98% pure having an Iodine Adsorption No. of about 135. The formulation which was a dry powder after premixing was fed to a Premier colloid mill and produced a cohesive paste which was easily extruded into a cylindrical shape, cut into suitable lengths and packaged. The dispersion was firm and non-tacky up to about 170°F. However, it softened into a honey or molasses consistency in a fairly narrow range of 170–180°F, which is ideal for fast incorporation into polymers. The dispersion was perfectly compatible and non-blooming in several polymer test compounds.

At the same time, the product was excellent lubricity and particle mobility for enhanced dispersion in rubber. In this respect, the rate of incorporation into the rubber was increased as much as 50%, reducing the possibility of scorch. The dispersion was very stable to changes from time, temperature, and humidity.

Suitable agents that could be substituted for sorbitan mono-oleate in the above formulation, are stearic acid, isostearic acid, dioctylphthalate, and lecithin. Suitable thickeners besides micro-crystalline wax are paraffin wax, Bentone 34, Bentone 38, metallic soaps and other gellants A lodige mixer preferably was employed in the above example prior to conversion since it provides quick mixing necessary to minimize hydration of the magnesium oxide.

The solids content of 72% was 5 to 10% higher than that obtainable with any other single pass dispersion mill. Passing the same powder preblend through a 3-roll ink mill stalled and almost broke the mill.

Advantages of the invention should be apparent. Obtaining a high loading in a paste dispersion, as compared to conventional dispersions, means there is less vehicle dilution of the product into which the dispersion is compounded. In addition, the dispersions have a higher degree of activity, probably due to an increase in the available surface area of the solid brought about by deagglomeration and some comminuting of the solid particles, and also due to a thinner film of vehicle covering each particle. In this respect, it has been found that a magnesium oxide dispersed according to the teachings of this application, has a much higher activity in a polymer than the same oxide powder milled directly into the polymer. In other words, an inexpensive lower Iodine Adsorption Number magnesium oxide can provide activity in rubber equivalent to that obtained from an expensive much higher Iodine Number dry powder. Certain additional economies result from the higher loading, for instance, lower freight rates per pound of active material. Also in that the conversion is accomplished in essentially one step, avoiding pump recycle and multiple steps, a reduced cost of processing is effected. A rapid cycle time results in less energy cost for mixing and transport. It also results in less hydration of moisture sensitive solid materials and breakdown of heat sensitive vehicles.

The embodiments of the invention in which an exclusive property or privilege is claimed are defined as follows:

1. A process for preparing a high solids paste dispersion of fine particle size solid material in a vehicle which comprises premixing solid material with a liquid vehicle and a surface active agent, the proportions of solid material, vehicles and surface active agent being such as to produce a discrete flowable powder,
   and passing said discrete flowable powder through a colloid mill to convert the same to a paste dispersion in the form of a coherent mass.

2. The process of claim 1 wherein such solid material and vehicle are heat stable at 300°F.

3. The process of claim 2 wherein such vehicle is a mineral oil.

4. The process of claim 3 wherein such mineral oil has a viscosity between about 1,000 and about 6,000 Saybolt Universal seconds at 100°F.

5. The process of claim 4 wherein such solid material has an average particle size between about 0.02 and about 2.0 microns, said colloid mill having a gap setting between about 0.01 and about 0.025 inches.

6. The process of claim 3 wherein said mineral oil has a viscosity of more than about 70 seconds Saybolt Universal at 100°F, said colloid mill having a gap setting of at least about 0.003 inches but less than about 0.080 inches, the particle size of the finely divided material being less than about 10 microns.

7. The process of claim 1 wherein said surface active agent is a hydrocarbon having a long chain molecule of about 12–20 carbon atoms and hydroxyl polar groups thereon, said paste dispersion being suitable for polymer compounding.

8. The process of claim 1 wherein said finely divided solid material is of the class consisting of magnesium oxide, calcium oxide, and zinc oxide, said mixing occurring in a single rotor mixer.

9. The process of claim 1 wherein the amount of vehicle and surface active agent employed is about 5–15% by weight less than that required to wet the surface of the solid material, defined as the end point reached by spatula rub out employing ASTM test D-281, the amount of surface active agent being about 1–5% of the weight of the total dispersion.

10. The process of claim 9 wherein said vehicle is a mineral oil, said surface active agent being an oil solusurfactant having a hydrocarbon chain of about [X] carbon atoms and hydroxyl or carboxyl polar [groups] thereon.

The process of claim 10 wherein said powder [premix]er includes about 2-5% of a modifying agent of [the cl]ass consisting of waxes, metallic soaps, and ben[tones].

[12.] The process of claim 1 wherein said colloid mill is [fitt]ed with a millstone or artificial abrasive surface, [co]nversion to a paste occurring in one pass through [the m]ill.

[13.] A process for preparing a high solids paste disper[sion o]f magnesium oxide in a vehicle suitable for poly[mer c]ompounding, comprising the steps of
    [pro]cessing said magnesium oxide to an average parti[cl]e size of about 0.02-1 microns;
    mixing said magnesium oxide with a mineral oil [h]aving a viscosity between about 1,000 and about [6],000 Saybolt Universal seconds at 100°F and with [a] surface active agent;
    [said] premix comprising in percentages by weight [a]bout 65-75% magnesium oxide, about 2-5% sur[fa]ce active agent, the remainder mineral oil, and [b]eing in the form of a discrete flowable powder, [a]nd
    [pas]sing said premix through a colloid mill having a [g]ap setting of about 0.010-0.025 inches to convert [t]he powder to a paste dispersion in the form of a [c]oherent mass.

[14.] The process of claim 13 wherein said surface [activ]e agent is of the class consisting of stearic acid, isostearic acid, sorbitan mono-oleate, dioctylphthalate and lecithin.

15. The process of claim 14 wherein said mixture further includes about 2-5% by weight modifying agent of the class consisting of waxes, metallic soaps and aminated bentones.

16. A process for preparing a paste dispersion of calcium oxide or zinc oxide in a vehicle suitable for polymer compounding comprising the steps of
    processing said calcium oxide or zinc oxide to an average particle size of about 1-2 microns;
    mixing said calcium oxide or zinc oxide with a mineral oil having a viscosity between about 1,000 and about 6,000 Saybolt Universal seconds at 100°F and with a surface active agent;
    said mixture comprising in percentages by weight about 75-90% calcium oxide or zinc oxide, about 1-3% surface active agent, the remainder mineral oil, and being in the form of a discrete flowable powder;
    and passing said mixture through a colloid mill having a gap setting of about 0.010-0.025 inches to convert the powder to a paste dispersion in the form of a coherent mass.

17. The process of claim 16 wherein said surface active agent is of the class consisting of stearic acid, isostearic acid, sorbitan mono-oleate, dioctylphthalate and lecithin.

18. The process of claim 16 wherein said mixture further includes about 2-5% by weight modifying agent of the class consisting of paraffin waxes, micro-crystalline wax, metallic soaps and bentones.

* * * * *

UNITED STATES PATENT OFFICE
CERTIFICATE OF CORRECTION

PATENT NO. : 3,951,849
DATED : Apr. 20, 1976
INVENTOR(S) : Glenn C. Vickery et al It is certified that error appears in the above-identified patent and that said Letters Patent are hereby corrected as shown below:

Columns 3 and 11 should read as per attachments.

Column 4, lines 45-48, after "(SUS-5000)" and before "1,500" all the lettering should appear in lightface type print.

Column 5, line 36, "890,262" should appear in lightface type print.

Signed and Sealed this

Eighth Day of February 1977

[SEAL]

Attest:

RUTH C. MASON
Attesting Officer

C. MARSHALL DANN
Commissioner of Patents and Trademarks mass. The same is accomplished substantially instantaneously with a holding time of less than a few seconds.

Conventional gap settings and speeds for the colloid mill 16 can be employed. Use of a gap setting in the range of 0.002–0.080 inches is workable, with a gap setting in the range of 0.010–0.025 inches being preferred. Conventional speeds for the colloid mill are in the range of 5,000 – 20,000 RPM.

The significant feature of the present invention is that the amount of finely divided solid material in the dispersion is about 5% to about 10% higher than that obtainable with conventional mixing or milling techniques. For instance, with a three roll mill, employing magnesium oxide as the solid material, the highest loading possible with conventional techniques while still obtaining a paste or coherent mass is about 55–60%. Increasing the loading any further results in insufficient wetting of the surface of the solid material, and the product even if millable is in the form of a powder or agglomeration, far removed from a paste.

In the present invention, the concentration of solid particles in the starting material is increased purposely so that following mixing in mixer 12 (and even three-roll milling), the mix is a flowable granular product. The surprising aspect of the invention is that this granular mixture can then be converted to a cohesive soft paste, substantially instantaneously, by passage through the colloid mill.

The actual proportions of solid material, vehicle and deagglomerating agent must be predetermined for each dispersion. The proportions will vary depending upon the type of vehicle, type of deagglomerating agent, type of material, and also on the particle size of the material (with a coarser material, less vehicle is used). Particularly, the amount of vehicle and deagglomerating agent should be insufficient to form a continuous liquid phase in the premix following mixing. On the other hand the amount should be sufficient that during passage through the colloid mill conversion to a paste occurs.

The optimum proportions for each dispersion can be determined by employing the ASTM Test D-281 (Index of ASTM Standards, 1969) entitled "Oil Absorption of Pigments by Spatula Rub Out." The vehicle with deagglomerating agent therein is added to the powdered or granular solid material, employing spatula rub out, until an end point of maximum absorption is reached. This end point conventionally gives an oil absorption number. However, the optimum proportions (in accordance with the present invention) of solid material, vehicle and deagglomerating agent can also be obtained by first determining the proportions at this end point and then increasing the solids content by about 5–15%, for example from 60% to 65–75%.

In a particular example, employing magnesium oxide having an average particle size prior to milling of about 0.02–1 microns, the end point (depending upon the vehicle and deagglomerating agent) is reached at a solids concentration of about 55–60% by weight. Conversion to a paste with the same magnesium oxide occurs in the colloid mill with a concentration from about 65 to about 75% by weight, the remainder being vehicle and deagglomerating agent (2–5% for the latter). In the case of calcium oxide having a coarser particle size of about one micron (average following comminution) and an end point at about 70–75% by weight solids, the optimum premix in accordance with the present invention will comprise about 75–90% by weight solid material, about 1% deagglomerating agent and the remainble surfactant having a hydrocarbon chain of about 12-20 carbon atoms and hydroxyl or carboxyl polar groups thereon.

11. The process of claim 10 wherein said powder further includes about 2-5% of a modifying agent of the class consisting of waxes, metallic soaps, and bentones.

12. The process of claim 1 wherein said colloid mill is provided with a millstone or artificial abrasive surface, the conversion to a paste occurring in one pass through the mill.

13. A process for preparing a high solids paste dispersion of magnesium oxide in a vehicle suitable for polymer compounding, comprising the steps of processing said magnesium oxide to an average particle size of about 0.02-1 microns;

premixing said magnesium oxide with a mineral oil having a viscosity between about 1,000 and about 6,000 Saybolt Universal seconds at 100°F and with a surface active agent;

said premix comprising in percentages by weight about 65-75% magnesium oxide, about 2-5% surface active agent, the remainder mineral oil, and being in the form of a discrete flowable powder, and passing said premix through a colloid mill having a gap setting of about 0.010-0.025 inches to convert the powder to a paste dispersion in the form of a coherent mass.

14. The process of claim 13 wherein said surface active agent is of the class consisting of stearic acid,